(12) United States Patent
Awano (10) Patent No.: US 7,606,436 B2
(45) Date of Patent: Oct. 20, 2009

(54) IMAGE ENCODING APPARATUS AND QUANTIZATION CONTROL METHOD

(75) Inventor: Jun Awano, Tokyo (JP)

(73) Assignee: NEC Corporation, Tokyo (JP)

( * ) Notice: Subject to any disclaimer, the term of this patent is extended or adjusted under 35 U.S.C. 154(b) by 845 days.

(21) Appl. No.: 10/955,794

(22) Filed: Sep. 30, 2004

(65) Prior Publication Data

US 2005/0069215 A1    Mar. 31, 2005

(30) Foreign Application Priority Data

Sep. 30, 2003    (JP)    ............................. 2003-339142

(51) Int. Cl.
*G06K 9/36*    (2006.01)
(52) U.S. Cl. ...................................... 382/252; 382/251
(58) Field of Classification Search ................ 382/232, 382/233, 239, 250–252
See application file for complete search history.

(56) References Cited

U.S. PATENT DOCUMENTS 5,629,780 A *    5/1997    Watson ........................ 382/250

6,496,607 B1 *    12/2002    Krishnamurthy et al. ..... 382/282

FOREIGN PATENT DOCUMENTS

| JP | 4-257185 | 9/1992 |
|---|---|---|
| JP | 2001-025008 | 1/2001 |
| WO | WO 02/080567 A1 | 10/2002 |

OTHER PUBLICATIONS

Test Model 5, Draft Revision 2, "10 Rate Control and Quantization Control" (Apr. 7, 1993).

* cited by examiner

*Primary Examiner*—Duy M Dang
(74) *Attorney, Agent, or Firm*—Scully, Scott, Murphy & Presser, P.C.

(57) ABSTRACT

An image encoding apparatus includes a quantization control section that supplies a rounded Q-scale to a quantization section for quantizing each macroblock according to the rounded Q-scale. A Q-scale is generated for each macroblock based on the amount of generated codes produced by encoding. The Q-scale is rounded within a set range by a rounding control section. The rounded Q-scale is smaller in amount than the Q-scale. Since the same Q-scale values will continue in succession, these can be omitted from a stream, allowing the reduced amount of quantization information and the increased amount of information allocated to images.

15 Claims, 6 Drawing Sheets

| REGION NUMBER | QSC RANGE | | REGION WIDTH |
|---|---|---|---|
| | LOWEST VALUE | HIGHEST VALUE | |
| 1 | 0 | 3 | 4 |
| 2 | 4 | 7 | 4 |
| 3 | 8 | 11 | 4 |
| 4 | 12 | 15 | 4 |
| 5 | 16 | 19 | 4 |
| 6 | 20 | 23 | 4 |
| 7 | 24 | 27 | 4 |
| 8 | 28 | 31 | 4 |

*QSC = 0 FORBIDDEN

FIG.6

IMAGE ENCODING APPARATUS AND QUANTIZATION CONTROL METHOD

BACKGROUND OF THE INVENTION

1. Field of the Invention

The present invention relates to an image encoding apparatus which performs encoding of image data divided into a plurality of blocks, and particularly to a quantization control method for determining quantization information for each block.

2. Description of the Related Art

There has been widely known a method disclosed in TM5 (Test Model 5, Draft Revision 2) document as an encoding control method in the context of MPEG (Moving Picture Experts Group) encoding scheme, and is commonly used as a basis for designing MPEG encoding apparatuses and programs. As is well known, in the MPEG scheme, an image is transformed by the discrete cosine transform (DCT), which is a type of orthogonal transformation, into DCT coefficients. Each transformed DCT coefficient is quantized such that it is divided by a quantization scale (referred to hereinafter as "a Q-scale") and its result is rounded. The quantized DCT coefficients are subjected to variable length coding (VLC) by which codes are sequentially allocated to the quantized DCT coefficients, to form a bit stream. The encoded stream of image information thus obtained is output together with header information about motion vectors, the Q-scale, and other parameters at a rate determined depending on the target bit rate.

The Q-scale used to quantize the DCT coefficients is usually controlled by a quantization control section. Quantization control is performed for two purposes: (1) the dependence of the amount of code generation on the target amount of codes, and (2) the reduction of image quality degradation. The dependence of the amount of code generation on the target amount is achieved by computing a basic Q-scale so as to reduce an error between the actual amount of code generation and the target amount of codes. Image quality degradation can be reduced by modulating the base Q-scale using a coefficient that indicates the complexity of the image. Such modulation utilizes the human vision characteristic whereby degradation is less perceptible in regions with complicated patterns, and is, conversely, more perceptible in flat regions.

For example, Japanese Laid-Open Patent Application No. 2001-025008 (paragraphs 0026 to 0028 of Specification; see FIG. 1) discloses a variable-rate motion image encoder wherein quantization control is performed in accordance with image complexity and the target amount of codes.

SUMMARY OF THE INVENTION

As described above, a stream encoded with MPEG contains header information about various flags, the Q-scale, and motion vectors in addition to image information, but this header information cannot be compressed by quantization. When encoding is performed at a sufficient rate that is commensurate with the picture rate and the resolution of the image being coded, this fact does not present a problem because an adequate amount of codes can be also allocated to the image information other than header information.

However, the proportion of header information in the total amount of codes increases with a reduction in the target bit rate, and it becomes impossible to allocate a sufficient amount of codes to the image information. Since information about the Q-scale and motion vectors is set for each macroblock (MB), it becomes impossible to allocate a sufficient amount of codes to the high-resolution image information with an increased number of macro blocks, and image degradation becomes significant. In digital terrestrial broadcasts, a HDTV (High Definition Television) image with a resolution of 1920×1080 or 1440×1080 is encoded at a bit rate of 12 Mpbs to 16 Mbps, and the aforementioned image degradation becomes a serious problem under such coding conditions.

In view of the above, an object of the present invention is to provide an image encoding apparatus and a quantization control method thereof that make it possible to suppress image degradation when high-resolution images are encoded at a relatively low bit rate.

In MPEG, a 5-bit QSC (Quantizer Scale Code) that indicates the Q-scale of a current macro block (MB) can be omitted from the stream when the Q-scale of the macroblock to be encoded is equal to the Q-scale of the immediately preceding encoded MB (refer to ISO/IEC Standard No. 13818-2 (1996), sections 6.3.16 (quantizer_scale_code), 6.3.17.1 (macroblock_quant), and 6.2.5).

The present invention is intended to address this problem by using the characteristic of such an encoding scheme. Specifically, in accordance with the present invention, an image encoding apparatus for encoding an image divided into a plurality of blocks, includes: a quantizer for quantizing data of each block according to quantization information; a quantization information generator for generating first quantization information for each block based on at least the amount of codes generated by encoding; and a rounding controller for rounding the first quantization information within a set range to generate second quantization information that is smaller in amount than the first quantization information, wherein the second quantization information is used as the quantization information of the quantizer.

According to a first embodiment of the present invention, the rounding controller includes: a storage for storing the quantization information of an immediately preceding block; and a selector for selecting the quantization information of the immediately preceding block as the second quantization information when a difference between the quantization information of the immediately preceding block and the first quantization information of the block currently being processed falls within the set range, and selecting the first quantization information as the second quantization information when the difference falls out of the set range.

The set range preferably varies depending on the first quantization information. The set range may differ depending on whether the first quantization information of the block currently being processed is greater or less than the quantization information of the immediately preceding block.

According to a first embodiment of the present invention, the rounding controller includes: a frequency distribution storage for storing a frequency distribution of values of the first quantization information for blocks of an already encoded image; and a second quantization information generator for generating the second quantization information based on a representative value of a region to which the first quantization information of the block currently being processed belongs, according to the frequency distribution, wherein a possible range of values of the first quantization information is divided into a plurality of regions.

The representative value may be determined by the weighted averaging of the frequency distribution and values of the first quantization information in each of the plurality of regions. The representative value may be fixed at one of the highest value, lowest value, and center value in each of the plurality of regions.

The width of each of the plurality of regions may be set depending on a frequency of the frequency distribution corresponding to the region. The frequency distribution may be a QSC (Quantizer Scale Code) frequency distribution of the first quantization information, wherein the second quantization information generator generates the representative value that is a QSC.

According to another aspect of the present invention, a quantization control method in an image encoding apparatus wherein an image divided into a plurality of blocks is encoded or each block, includes: a) generating first quantization information for each block based on at least an amount of codes generated by encoding; b) generating second quantization information that is smaller in amount than the first quantization information by rounding the first quantization information within a set range; and c) quantizing data of each block using the second quantization information.

As described above, according to the present invention, the first quantization information is rounded under a given condition to produce the second quantization information. The number of values assumable by the second quantization information is smaller than the number of values assumable by the first quantization information, resulting in the reduced probability that the current quantization information of a block being currently encoded will be equal to that of the immediately preceding encoded block, making it more likely that the quantization information will be omitted from the encoded stream. Accordingly, the amount of codes allocated to image information itself can be increased in proportion to the omission of the quantization information, and good image quality can be obtained even when high-resolution images are encoded at a low bit rate.

For example, in the case of HDTV or the like, good image quality can be maintained in comparison with a conventional scheme when high-resolution images are encoded at a low bit rate. In addition, this effect becomes more pronounced as the number of blocks increases. The advantage of the present invention is remarkably high with HDTV because images with a resolution of 1920×1080 or 1440×1080 are used and the number of blocks in each is extremely large, at 8160 or 6120, respectively.

DESCRIPTION OF THE PREFERRED EMBODIMENTS

Figure 1:
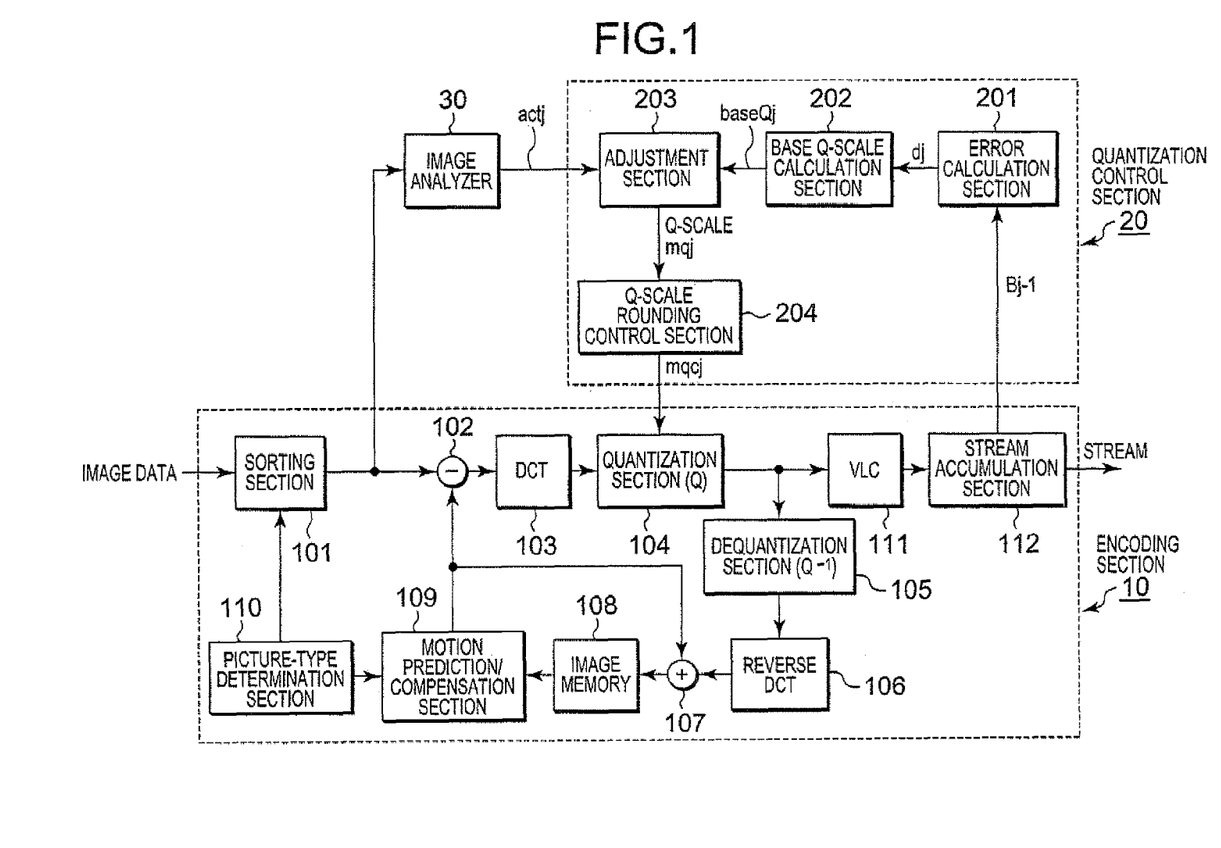
FIG. 1 is a block diagram showing the circuit structure of the image encoding apparatus according to an example of the present invention.

Referring to FIG. 1, an image encoding apparatus according to a preferred mode of the present invention is provided with an encoding section 10, a quantization control section 20, and an image analyzer 30. The encoding section 10 performs DCT transformation of input image data, and quantization of DCT coefficients, and variable-length coding of quantized DCT coefficients, and outputs the result as a stream composed of coded image information and header information. The quantization control section 20 controls the Q-scale of the encoding section 10 by using the amount of generated codes input from the encoding section 10 and feature data representing the complexity and other parameters of the image input from the image analyzer 30, which will be described later.

In the encoding section 10, a sorting section 101 sorts input images according to picture types in the order in which, they are coded, and outputs the sorted images to a DCT section 103 via a subtraction section 102. The DCT section 103 transforms image data or subtracted image data inputted from the subtraction section 102 into DCT coefficients and outputs them to a quantization section 104. The quantization section 104 performs quantization such that the DCT coefficients are divided by the Q-scale mqcj inputted from the quantization control section 20, and outputs the quantized DCT coefficients to a variable-length encoder 111, which encodes the quantized DCT coefficients by the variable-length coding. As is well known, the variable-length encoder 111 performs variable length coding whereby shorter codes are sequentially allocated to quantized DCT coefficients that occur more frequently, and the resulting stream is output to a stream accumulation section 112.

The quantized DCT coefficients obtained by the quantization section 104, only in the case of I-pictures and P-pictures, are output to a dequantization section 105 as well, and are dequantized with the same Q-scale mqcj as the one used in the quantization section 104. The DCT coefficients restored by dequantization are transformed into the original image or differential image by a reverse DCT section 106. Motion prediction processing and motion compensation processing are performed by an addition section 107, a motion compensation image memory 108, a motion prediction/compensation section 109, and the subtraction section 102. The picture type of an input image is provided to the sorting section 101 and motion prediction/compensation section 109 by a picture-type determination section 110.

The stream accumulation section 112 accumulates the stream outputted from the variable-length encoder 111 and outputs it at a rate determined depending on the target bit rate. As described above, the input stream contains, in addition to image information, header information including various types of coding information about the motion vectors obtained during the generation of differential images, the Q-scale used in quantization, and the like. The stream accumulation section 112 provides the quantization control section 20 with the amount of accumulated data of a stream and the amount of generated codes obtained by counting input codes.

The quantization control section 20 determines the Q-scale on the basis of the amount of accumulated data of a stream, the amount of generated codes obtained by counting input codes, which are inputted from the stream accumulation section 112, as well as the feature data of the image inputted from the image analyzer 30, and outputs the determined Q-scale to the quantization section 104. The quantization control section 20 has an error calculation section 201, a base Q-scale calculation section 202, an adjustment section 203, and a Q-scale rounding control section 204.

Error Calculation Section

Based on the amount of accumulated data of a stream, the amount of generated codes obtained by counting input codes, which are inputted from the stream accumulation section 112, the error calculation section 201 calculates an error $d_j$ between the target code amount and the actual generated code amount by using, for example, Eq. (1) below:

$$d_j = d_0 + \left(B_{j-1} - T \cdot \frac{j-1}{MB\_num}\right). \quad (1)$$

In Eq. (1), $d_0$ is a value of $d_j$ at the time when coding is completed for an immediately preceding image of the same picture type as the currently coded image, and a separate value is retained for each picture type. $B_j$ is the actual amount of generated codes from when encoding is started for the current image to when the j-th macroblock MB has been encoded. MB_num is the total number of macroblocks determined depending on the resolution of an input image. T is the target code amount for a current image determined depending on encoding conditions such as the picture type and the coding difficulty of the current image and the target bit rate. The target code amount can be determined using Eq. (2) for I-picture, Eq. (3) for P-picture, and Eq. (4) for B-picture.

$$T = \max\left\{\frac{R}{1 + \frac{Np \cdot Xp}{Xi \cdot Kp} + \frac{Nb \cdot Xb}{Xi \cdot Kb}}, \frac{bit\_rate}{(8 * picture\_rate)}\right\} \quad (2)$$

$$T = \max\left\{\frac{R}{Np + \frac{Nb \cdot Kp \cdot Xb}{Kb \cdot Xp}}, \frac{bit\_rate}{(8 * picture\_rate)}\right\} \quad (3)$$

$$T = \max\left\{\frac{R}{Nb + \frac{Nb \cdot Kb \cdot Xp}{Kp \cdot Xb}}, \frac{bit\_rate}{(8 * picture\_rate)}\right\} \quad (4)$$

In these equations, Kp and Kb are parameters for biasing the amount of allocated codes for each type of picture in order to reduce quality degradation. These parameters may, for example, be set to Kp=1.0 and Kb=1.4 so that the amount of allocated codes to I-picture and P-picture is greater than that to B-picture. In the case of an image with high coding difficulty and reduced inter-image correlation, the parameters can be adaptively changed and set to Kp=1.2 and Kb=1.2 to eliminate the difference between the amount of allocated codes to P-picture and the amount of allocated codes to B-picture. Other values may also be used in a fixed or adaptive manner.

Np and Nb indicate the numbers of P-pictures and B-pictures, respectively, which have not been coded among the pictures of a current GOP (Group of Pictures). The term "bit_rate" indicates a target bit rate, and the term "picture_rate" indicates a picture rate, which is the number of images displayed per second.

R is the remaining amount of codes available in the GOP to which a current image belongs at the time when the current image is coded. This value is reset according to the formula $R$=bit_rate*$N$/picture_rate before the starting image of the GOP is coded, and is then updated by sequentially subtracting the actual amount of generated codes for each image every time the image is coded. As used herein, N designates the number of images that constitute a GOP.

Xi, Xp, and Xb indicate coding difficulties for I-picture, P-picture, and B-picture, respectively, and can be calculated using the following formulas:

Xi=SiQi,

Xp=SpQp, and

Xb=SbQb.

In these formulas, Si, Sp, and Sb represent the amount of codes generated as a result of encoding an immediately preceding I-picture, P-picture, and B-picture, respectively. Qi, Qp, and Qb represent mean values of Q-scales allocated to each MB when these images are encoded. In Eqs. (2) to (4), "max(a, b)" indicates that the greater of the two values a and b is selected.

In calculations of the error $d_j$ between the actual amount of generated codes and the target amount of codes in Eq. (1), a deviation from the amount of stream data accumulated in the stream accumulation section 112 gradually increases as the $d_0$ value is sequentially updated from the start of coding. In order to avoid such a situation, $d_0$ may also be reset by the amount of stream data accumulated in the stream accumulation section 112 at a time, for example, after the image processing for a GOP has been completed. When the amount of accumulated stream data inputted from the stream accumulation section 112 approaches the maximum amount of accumulated stream data in the stream accumulation section 112, a correction may also be made so that the error $d_j$ of the amount of codes increases. For example, the error $d_j$ may increase by a multiplication factor of two or greater when the amount of stream data accumulated in the stream accumulation section 112 is 80% or greater of the previous amount of accumulated stream data.

Base Q-scale Calculation Section

When receiving an error $d_j$ between the actual amount of generated codes and the target amount of codes from the error calculation section 201, the base Q-scale calculation section 202 calculates the base Q-scale (baseQj) for controllably keeping the amount of generated codes at the level of the target amount of codes using, for example, Eq. (5) below, and the result is output to the adjustment section 203.

$$baseQj = \frac{d_j * 31}{r} \quad (5)$$

In the Eq. (5), r is a parameter that determines the speed of response to the error. This parameter may, for example, be calculated as r=2*bit_rate/picture_rate.

Adjustment Section

The adjustment section 203 modulates the base Q-scale (baseQj), for example, in accordance with Eq. (6) below in order to reduce image degradation, and outputs the modulated Q-scale mqj to the Q-scale rounding control section 204.

$mqj$=baseQj*$N\_actj$ (6)

In the Eq. (6), N_actj is the amount of modulation calculated using the feature data actj of an image inputted from the image analyzer 30. It is assumed herein that the activity representing the spatial frequency of an input image is used as the feature data actj, in which case N_actj can be calculated using Eq. (7) below:

$$N\_actj = \frac{n*actj\_average\_act}{actj + n*average\_act}. \quad (7)$$

Here, actj is the activity of the J-th MB within the current image, and average_act is the average value of actj in the image. In addition, n is a parameter for determining the modulation width, which ranges from a factor of 1/n to a factor of n. For example, n is fixed at 2 in the case of TM5, but in cases such as those where the base Q-scale baseQ is large and the activity distribution or the coding difficulty distribution is locally high within an image, n can be varied from 2 up to 12 depending on the extent of these distributions, making it possible to achieve good image quality by employing such a dynamic modulation. It is apparent that n can fall outside the variability conditions or ranges indicated herein.

The image analyzer 30 analyzes an image inputted from the sorting section 101 and generates the aforementioned activity expressing the pattern complexity of the input image. The image analyzer 30 can also generate information related to the intensity of visually sensitive red colors and to other visual image quality improvements, either singly or as a combination.

Q-scale Rounding Control Section

The Q-scale rounding control section 204 performs rounding under a given condition for the Q-scale mqj modulated by the adjustment section 203, and generates a Q-scale mqcj in which the number of values assumable by the Q-scale mqcj is reduced. Specifically, as described later, the Q-scale can be selected or substituted with a representative value to become equal to the Q-scale of the MB that has been encoded immediately before under a given condition. The probability that QSC will be omitted from the stream will be higher if quantization is performed in accordance with the Q-scale mqcj thus rounded, as described above. Accordingly, the amount of codes allocated to image information itself can be increased in proportion to the QSC omission, and good image quality can be obtained even when high-resolution images are encoded at a low bit rate. The Q-scale rounding control section 204 will be described below in further detail.

First Embodiment

Figure 2:
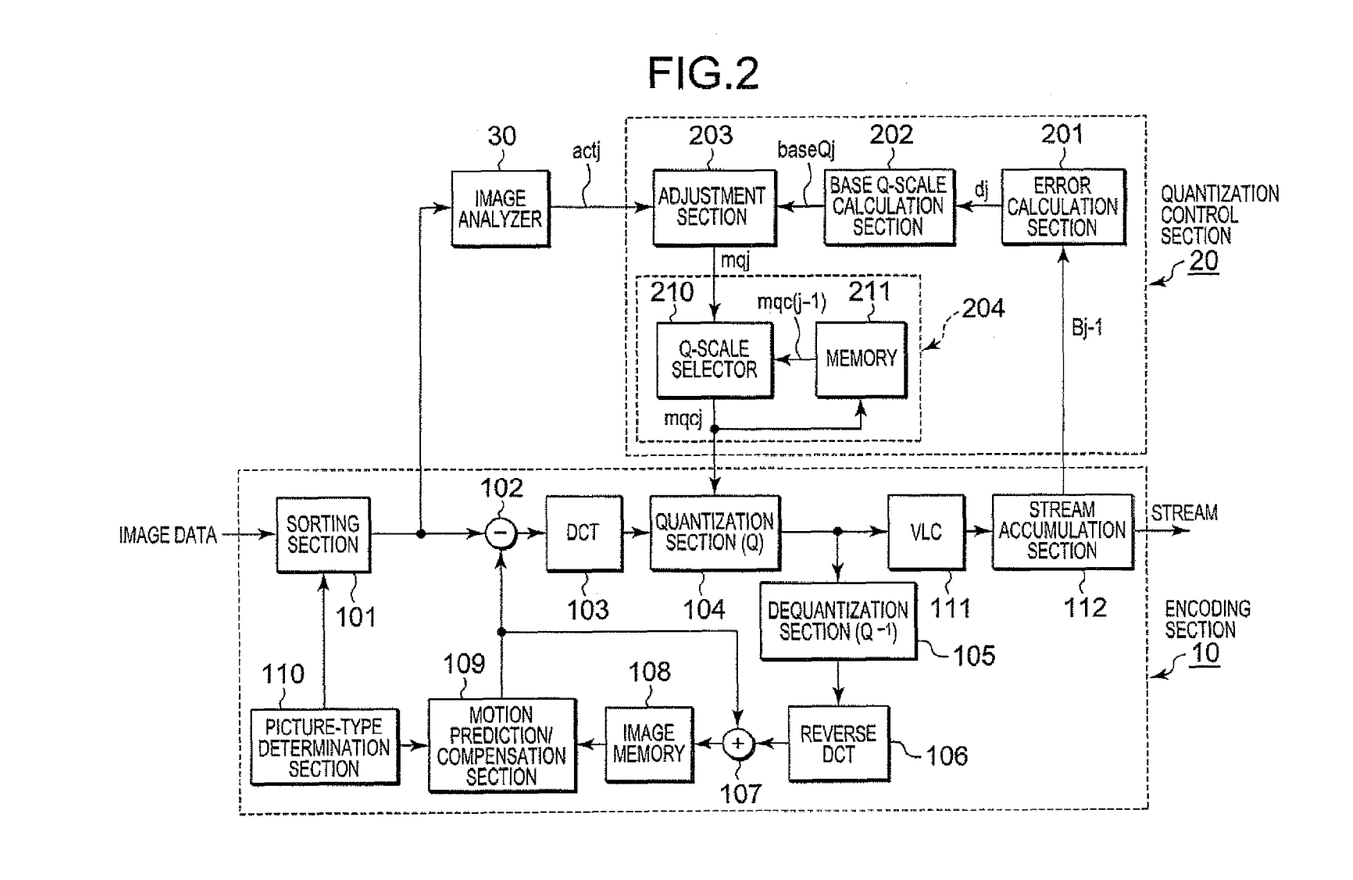
FIG. 2 is a block diagram showing the circuit structure of an image encoding apparatus according to a first example of the present invention.

Referring to FIG. 2, the Q-scale rounding control section 204 in this example has a Q-scale selector 210 and memory 211. The Q-scale selector 210 compares the modulated Q-scale mqj of the current MB inputted from the adjustment section 203, with the immediately preceding selected mqc(j−1) that is read from memory 211.

If the absolute value of the difference diff_mq=mqj−mqc(j−1) between the two is less than a specific threshold value, then the mqj value of the current MB is changed to the same value as the immediately preceding mqc(j−1), and the result is output as the Q-scale mqcj of the current MB to the quantization section 104 and is stored in memory 211. Specifically, the immediately preceding Q-scale is used if the difference in the Q-scale between the current MB and the immediately preceding MB is less than the specific threshold value, whereby the QSC that expresses the Q-scale of the current MB can be omitted from the stream. If, on the other hand, the absolute value of the diff_mq is equal to or greater than the specific threshold value, or if the current MB is at the left-hand edge of the screen, the mqj value of the current MB is output unchanged to the quantization section 104 and stored in memory 211.

Figure 3:
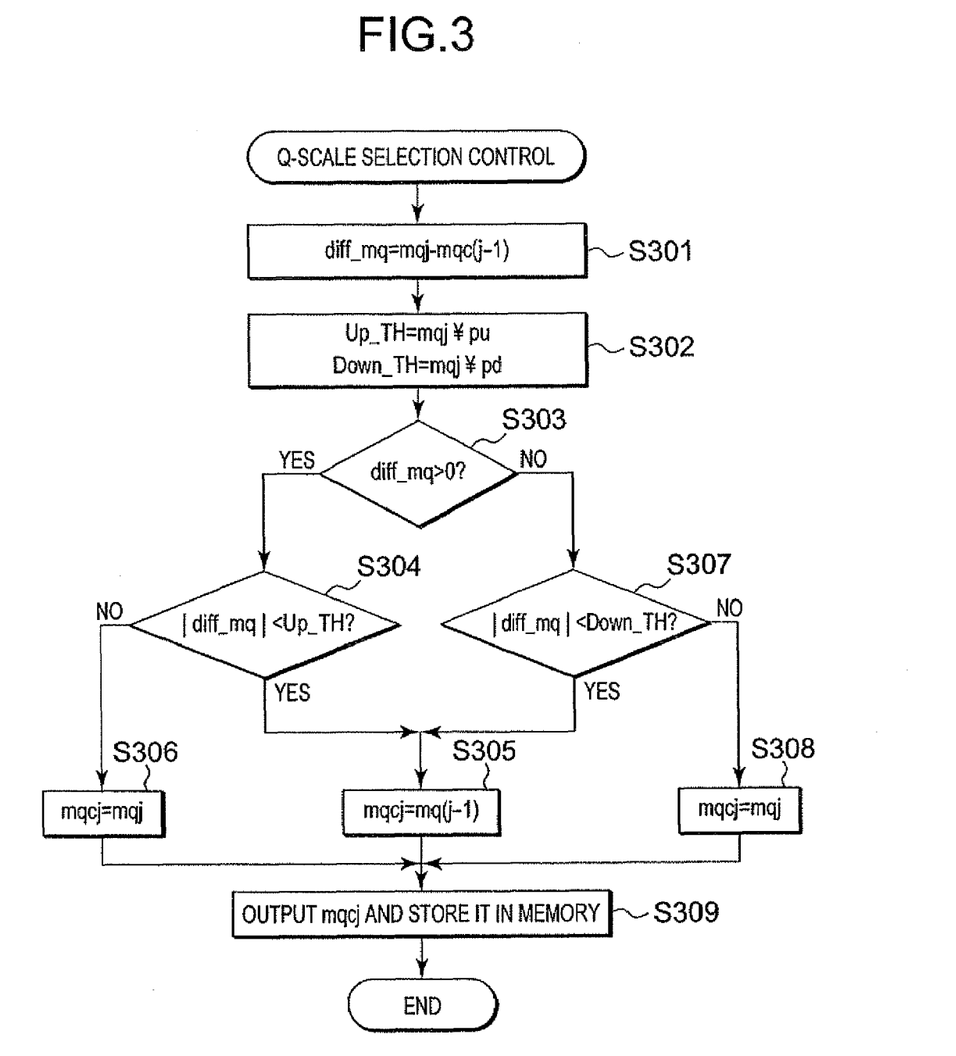
FIG. 3 is a flowchart showing the Q-scale rounding control in the first example of the present invention.

FIG. 3 shows the Q-scale rounding control in the first example of the present invention. Here, it is assumed that a Q-scale mqj is output from the adjustment section 203 for the j-th MB currently being processed, and the Q-scale mqc(j−1) of the immediately preceding encoded MB is stored in memory 211.

The Q-scale selector 210 first calculates the differential diff_mq between the Q-scales mqj and mqc(j−1) (step S301). Subsequently, the threshold values Up_TH and Down_TH for judgment on the differential diff_mq are determined as Up_TH=mqj*pd and Down_TH=mqj*pd, respectively (step S302).

Here, the threshold values Up_TH and Down_TH are set separately depending on the positive or negative sign of the differential diff_mq, and are adaptively varied in accordance with the magnitude of mqj. Varying these values in accordance with mqj allows the amount of Q-scale information to be efficiently reduced while maintaining image quality, and is beneficial for attaining the objects of the present invention. When HDTV is encoded, the best results can be obtained by setting pu and pd so that pu=0.40 and pd=0.20, respectively, but other values may also be used depending on the circumstances Furthermore, pu and pd may be the same values. Alternatively, the threshold values Up_TH and Down_TH are calculated using mqc(j−1) such that Up_TH=mqc(j−1)*pd and Down_TH=mq(j−1)*pd. It should be noted, however, that using mqj makes it easier for changes to be made in the direction in which the Q-scale is reduced, and is beneficial for the image quality on borders from a region with complicated patterns to a region without complication.

The picture type, coding difficulty, and other indices can be used in addition to the mqj value in the adaptive varying of the threshold values Up_TH and Down_TH, and a joint use thereof is also acceptable. Another alternative is to use the threshold values Up_TH and Down_TH as fixed threshold values, in which case the two values may be the same or different.

It is subsequently determined whether diff_mq is a positive value (step S303), and the absolute value of diff_mq, is compared with the Up_TH (step S304) if diff_mq>0 (YES in step S303). If the absolute value of diff_mq is less than Up_TH (YES in step S304), the mqc(j−1) of the immediately preceding MB stored in memory 211 is set to the Q-scale mqcj (step S305). The Q-scale mqcj is output to the quantization section 104, and is also stored in memory 211 (step S309). If the absolute value of diff_mq is equal to or greater than Up_TH (NO in step S304), the mqj of the current MB is set to the Q-scale mqcj (step S306), which is output to the quantization section 104, and is again stored in memory 211 (step S309).

On the other hand, the absolute value of diff_mq is compared with the Down_TH (step S307) if diff_mq≦0 (NO in step S303). If the absolute value of diff_mq is less than Down_TH (YES in step S307), the mqc(j−1) of the immediately preceding MB stored in memory 211 is set to the Q-scale mqcj (step S305), which is output to the quantization section 104, and is also stored in memory 211 (step S309). If the absolute value of diff_mq is equal to or greater than Down_TH (NO in step S307), the mqj of the current MB is set to the Q-scale mqcj (step S306), which is output to the quantization section 104, and is also stored in memory 211 (step S309).

Once the Q-scale is determined for the j-th MB in this manner, the same routine is performed for the (j+1)-th MB, and the Q-scale mqcj newly stored in memory 211 is used this time in determining the diff_mq.

A fixed threshold value is difficult to apply to the entire range of values assumable by the Q-scale. If, however, Q_Scale_Type, which is one of the coding control flags in MPEG, is limited to 1, that is, to a case of nonlinear quantization, then even a fixed value can have an effect similar to that obtained when the value is varied in accordance with the Q-scale, as long as the differences are compared after mqj and mqc(j−1) have each been transformed to QSCs. In other words, the Q-scale range allocated to each QSC broadens with an increase in QSC in the case of nonlinear quantization. Accordingly, variations can be better suppressed and a wider Q-scale range obtained with an increase in the Q-scale even when the difference in QSC is fixed. That is why even a fixed value can have an effect similar to that obtained when the value is varied in accordance with the Q-scale. More specifically, when the difference in QSC is 1, the difference in Q-scale assumes a value ranging from 1 to 8 depending on its magnitude. In this case, fairly good results can be obtained across the entire range of values assumable by the Q-scale even when fixed values are used, such as Up_TH=2 and Down_TH=1.

As described above, according to the first embodiment of the present invention, in the case where the difference in Q-scale between a current MB and the immediately preceding MB remains within a specific threshold value, the Q-scale of the current MB can be made the same as the Q-scale of the immediately preceding MB, and the QSC can be omitted from the stream. Accordingly, it is possible to increase the amount of codes allocated to image information and to obtain good image quality even when high-resolution images are encoded at a low bit rate.

Second Embodiment

Figure 4:
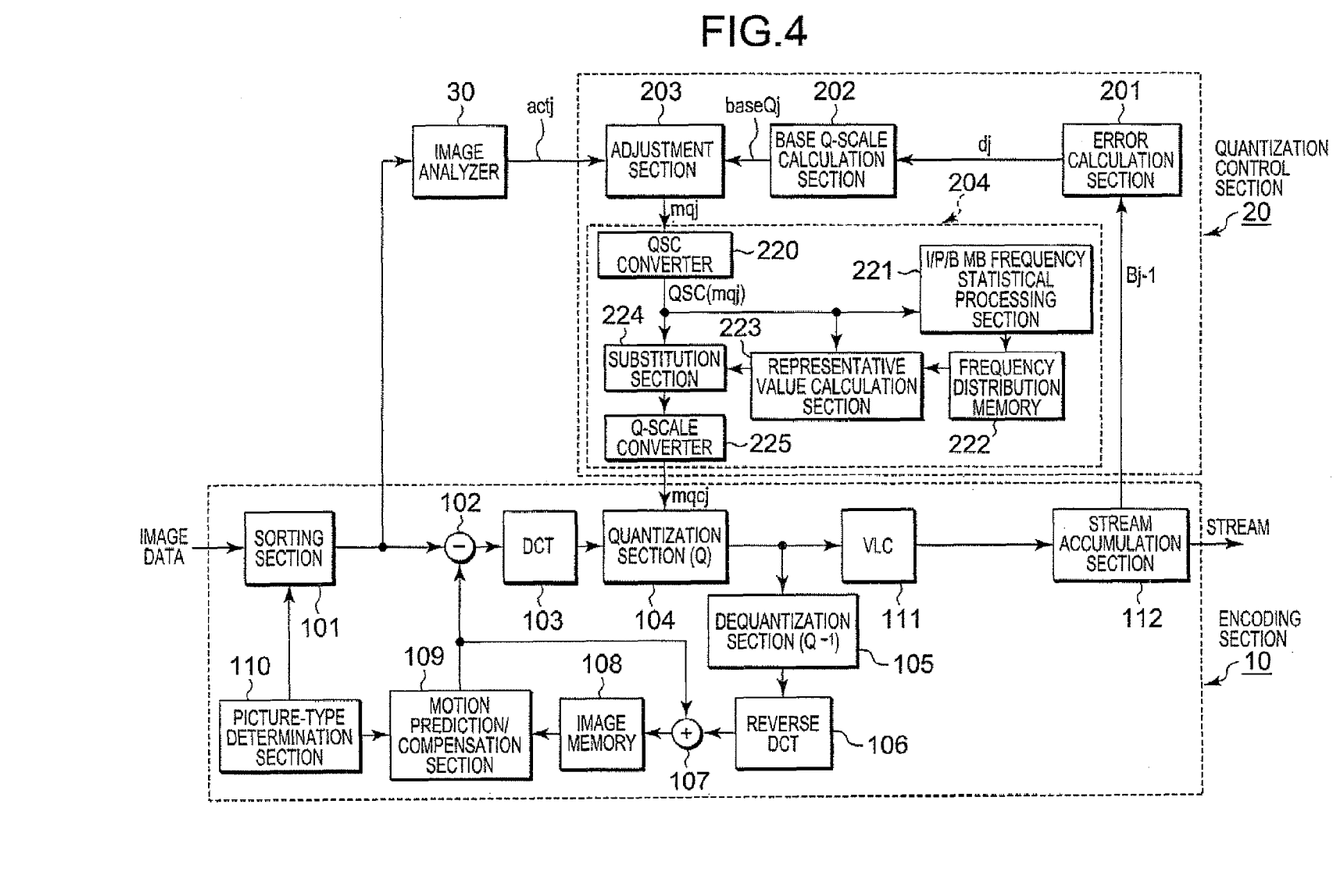
FIG. 4 is a block diagram showing the circuit structure of an image encoding apparatus according to a second example of the present invention.

Referring to FIG. 4, the Q-scale rounding control section 204 in this embodiment is provided with a QSC converter 220, an MB frequency statistical processing section 221, a frequency distribution memory 222, a representative value calculation section 223, a substitution section 224, and a Q-scale converter 225.

The QSC converter 220 converts the Q-scale mqj inputted from the adjustment section 203 into QSC, which is a 5-bit code, and outputs the resultant QSC to the MB frequency statistical processing section 221, representative value calculation section 223, and substitution section 224. The MB frequency statistical processing section 221 statistically processes the frequency of MB QSC for every picture type, and stores frequency distribution data for a single image in the frequency distribution memory 222. The representative value calculation section 223 reads from the frequency distribution memory 222 the previously obtained frequency distribution data of the same picture type, divides the result into a specific plurality of QSC range regions, and determines the representative value QSCn of the QSC in each region. The substitution section 224 substitutes the representative value QSCn for the QSC(mqj) of the current MB and outputs the result to the Q-scale converter 225. The Q-scale converter 225 converts the representative value QSCn into a Q-scale mqcj and outputs it to the quantization section 104.

Figure 5A:
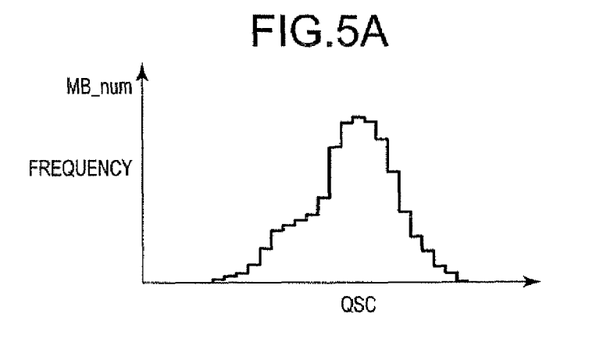
FIG. 5A is a graph depicting an example of MB frequency distribution data for a single image.

As shown in FIG. 5A, the MB frequency statistical processing section 221 counts QSC(mqj) sequentially inputted from the QSC converter 220 for each of the values 0 to 31 that can be assumed by the QSC (in reality, the QSC cannot be 0, but 0 is here included for convenience), to obtain the QSC distribution of MBs in a single image for each picture type (I/P/B), and stores the obtained QSC distribution in the frequency distribution memory 222.

Figure 5B:
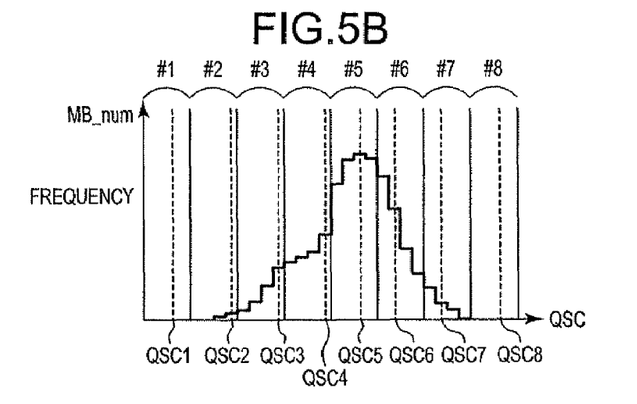
FIG. 5B is a diagram showing representative values in a plurality of regions into which the MB frequency distribution has been divided.

The representative value calculation section 223 reads the QSC frequency distribution data (MB_num [QSC]) regarding past images of the same picture type as the current image stored in the frequency distribution memory 222, and divides it into a plurality of regions that constitute a specific QSC range, as shown in FIG. 5B. Weighted averages are calculated according to Eq. (8) below by using QSC values and their frequencies in each region, and the results are taken to be the QSC representative value in each region.

$$QSCn = \frac{\sum_{QSC=QSC\_Ln}^{QSC\_Hn} (QSC * \text{MB\_num}[QSC])}{\sum_{QSC=QSC\_Ln}^{QSC\_H} \text{MB\_num}[QSC]} \qquad (8)$$

In the Eq. (8), QSCn is a QSC representative value in region n (n=1, 2, . . . , 8), and QSC_Ln and QSC_Hn indicate the lowest and highest QSC values, respectively, in region n.

Figure 5C:
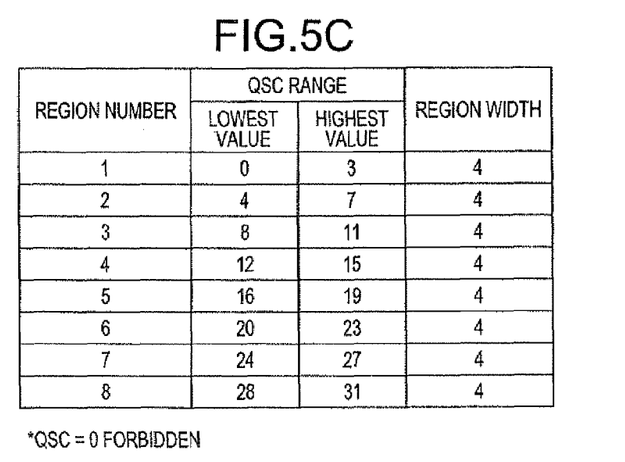
FIG. 5C is a diagram showing a table of region widths and QSC ranges in each region as an example.

When, for example, QSC is divided into regions with a region width of 4, there are a total of 8 domains #1 to #8, as shown in FIG. 5B, and the highest and lowest QSC values of each region are shown in FIG. 5C. At this time, eight representative QSC values QSC1 to QSC8 such as those shown in FIG. 5B are calculated using Eq. (8).

When all the QSC frequencies in a region are zeroes, it is assumed that QSCn=(QSC_Hn+QSC_Ln)/2, that is, the center QSC is taken as a represent value for that region. In the case of the even number of QSCs belonging to the relevant region, a rounded-up value is taken to be the representative value because the calculation to determine the center value gives a decimal place. As a way of determining a representative value in each region, it may be fixed at the center value of the highest and lowest values in the relevant region without the use of frequency. This method can dispense with the need of the MB frequency statistical processing section 221 and the weighted average processing of Eq. (8), resulting in lighter processing, but is disadvantageous for image quality.

In the above-described example of determining QSC representative values by weighted averaging, regions for calculating the QSC representative values were equally divided into a plurality of ranges, but it is also possible to adopt an approach in which the width of a region with a higher frequency is made narrower, and the width of a region with a lower frequency is made wider. This method, while less effective in reducing the QSC information, allows allocation of QSC to be more adequate to the pattern of an image. Accordingly, this method is more suitable in cases where the bit rate is low but has relatively plenty of room, for example, in the case where HDTV images are encoded at a rate of 14M to 16M. The method in which the width of a divided region depends on a MB frequency therein can also be applied to examples in which representative values are fixed at the center value of each region. However, in this case, since a frequency is used, the MB frequency statistical processing section 221 is needed.

The substitution section 224 determines the region to which the QSC(mqj) belongs based on the highest value, lowest value, and QSC representative value of each region inputted from the representative value calculation section 223, and replaces the QSC(mqj) with the QSC representative value of a corresponding region to output it to the Q-scale converter 225. A QSC is used to perform processing in the Q-scale rounding control section 204 of this embodiment, but similar processing may also be performed with the Q-scale in unaltered form. In this case, however, a Q-scale that does not assume the same value after being converted to a QSC is preferably selected as the Q-scale that is taken to be the representative value in each region by the MB frequency statistical processing section 221.

Figure 6:
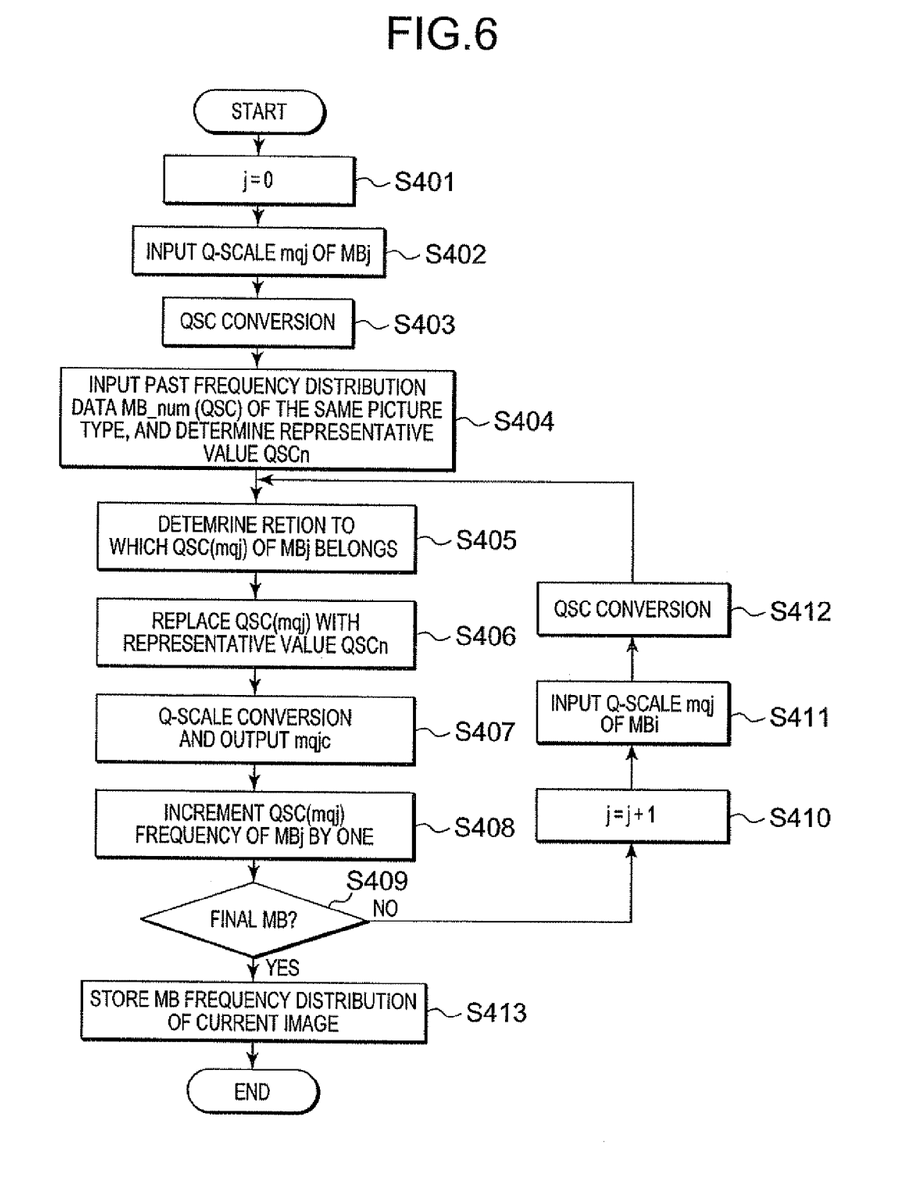
FIG. 6 is a flowchart showing a Q-scale rounding control according to the second example of the present invention.

Referring to FIG. 6, after a variable j is first initialized to 0 (step S401), the Q-scale mqj of the j-th MB is inputted from the adjustment section 203 (step S402), and it is converted to a QSC (step S403). Subsequently, the QSC frequency distribution data MB_num [QSC] of the immediately preceding image with the same picture type as the image currently being processed is read from the frequency distribution memory 222, and a representative value QSCn is calculated for each divided region by using Eq. (8) (step S404).

The image targeted for processing is subsequently processed in MB units (steps S405 to S412). First, the region to which the QSC of the current MB belongs is determined (step S405). It is assumed in this case that a range of the QSC values are equally divided into a plurality of regions, each of which has a fixed width of 4 as shown in FIG. 5B. In this case, the region numbers as shown in FIG. 5C can be directly obtained by dividing the QSC by four and adding 1 to the result, easily identifying the region to which the QSC of the current MB belongs.

The representative value QSCn of each region determined in advance in step S404 is subsequently used to replace the QSC of the current MB with the representative value QSCn of the QSC in the region n to which the current code belongs (step S406). The substituted representative value QSCn is converted to a Q-scale and is output as a Q-scale mqcj to the quantization section 104 (step S407).

To subsequently create frequency distribution information about the QSC of the current image, the frequency of the QSC of the current MB is incremented by one (step S408), and it is determined whether the current MB is the final MB in the current image (step S409). If the current MB is not final (NO in step S409), the variable j is incremented (step S410), the Q-scale mqj of the j-th MB is inputted from the adjustment section 203 (step S411), it is converted to a QSC (step S412), and the process returns to step S405. Steps S405 to S412 are repeatedly performed until the current MB becomes the final MB.

If the current MB is the final MB (YES in step S490), the frequency distribution data of QSC for the current image is stored in the frequency distribution memory 222 for each picture type in order to be used in the processing of the next image of the same picture type (step S413), and the routine is completed.

According to the second embodiment of the present invention, the representative value calculation section 223 determines several representative values as the actually used QSCs by using the QSC frequency distribution calculated by the MB frequency statistical processing section 221, and the substitution section 224 substitutes QSCs other than each representative value with the representative value of a corresponding region. The number of allocated QSCs is thereby reduced to the number of QSC representative values, and there is a higher probability that the codes will be omitted from the stream because of a continuous succession of the same QSCs. As a result, the amount of codes allocated to image information can be increased, resulting in good image quality even when high-resolution images are encoded at a low bit rate.

In the first and second embodiments as described above, the functional blocks shown in FIGS. 2 and 4 can be implemented as software, but the same functions can be achieved by running an encoding program that includes quantization control such as the one shown in FIGS. 3 and 6 on a CPU with adequate processing capabilities. Yet another alternative is to use a structure in which both software and hardware are used, such as implementing solely a quantization control section 20 such as the one shown in FIGS. 3 and 6 as software, and implementing the other sections as hardware.

The present invention can be widely used in any application that involves MPEG technology, such as encoding devices for digital terrestrial broadcasts in which high-resolution HDTV data is coded at a low bit rate, and other encoding devices or encoding programs for distributing moving images. Further, the present invention can be applied to devices and programs using not only MPEG but also another encoding system, such as H.264, having the feature that continuous arrival of Q-scales or QSCs of the same value makes it possible to omit that information from the stream.

What is claimed is:

1. An image encoding apparatus for encoding an image divided into a plurality of blocks, comprising:
   a quantizer for quantizing data of each block according to a DCT coefficient for said each block;
   a quantization information generator for generating first quantization information for each block based on at least an amount of codes generated by encoding;
   a rounding controller for rounding the first quantization information within a set range to generate second quantization information that is smaller in amount than the first quantization information; and
   a selector for selecting the quantization information of an immediately preceding block as the second quantization information when a difference between the quantization information of the immediately preceding block and the first quantization information of the block currently being processed falls within a set range, and selecting the first quantization information as the second quantization information when the difference falls out of the set range.

2. The image encoding apparatus according to claim 1, wherein the rounding controller comprises:
   a storage for storing the quantization information of the immediately proceeding block.

3. The image encoding apparatus according to claim 2, wherein the set range varies depending on the first quantization information.

4. The image encoding apparatus according to claim 2, wherein the set range differs depending on whether the first quantization information of the block currently being processed is greater or less than the quantization information of the immediately preceding block.

5. The image encoding apparatus according to claim 1, wherein the rounding controller comprises:
   a frequency distribution storage for storing a frequency distribution of values of the first quantization information for blocks of an already encoded image; and
   a second quantization information generator for generating the second quantization information based on a representative value of a region to which the first quantization information of the block-currently being processed belongs, according to the frequency distribution, wherein a possible range of values of the first quantization information is divided into a plurality of regions.

6. The image encoding apparatus according to claim 5, wherein the representative value is determined by the weighted averaging of the frequency distribution and values of the first quantization information in each of the plurality of regions.

7. The image encoding apparatus according to claim 5, wherein the representative value is fixed at one of the highest value, lowest value, and center value in each of the plurality of regions.

8. The image encoding apparatus according to claim 5, wherein a width of each of the plurality of regions is set depending on a frequency of the frequency distribution corresponding to the region.

9. The image encoding apparatus according to claim 5, wherein the frequency distribution is a QSC (Quantizer Scale Code) frequency distribution of the first quantization information, wherein the second quantization information generator generates the representative value that is a QSC.

10. A quantization control method in an image encoding apparatus wherein an image divided into a plurality of blocks is encoded for each block, comprising:
   a) generating first quantization information for each block based on at least an amount of codes generated by encoding;
   b) generating second quantization information that is smaller in amount than the first quantization information by rounding the first quantization information within a set range;
   c) storing quantization information of an immediately preceding block;
   d) generating a difference between the quantization information of the immediately preceding block and the first quantization information of the block currently being processed; and
   e) selecting the quantization information of the immediately preceding block as the second quantization information when the difference falls within the set range.

11. The quantization control method according to claim 10, further comprising:
   selecting the first quantization information as the second quantization information when the difference falls out of the set range.

12. The quantization control method according to claim 10, wherein step b) comprises: generating a frequency distribution of values of first quantization information for the blocks of an already encoded image; dividing a possible range of values of the first quantization information into a plurality of regions; and generating, as the second quantization information, a representative value for a region to which the first quantization information of the block currently being processed belongs, according to the frequency distribution.

13. A program stored on a computer readable storage medium to perform encoding of an image divided into a plurality of blocks, comprising:
   a) generating first quantization information for each block based on at least an amount of codes generated by encoding;
   b) generating second quantization information that is smaller in amount than the first quantization information by rounding the first quantization information within a set range;
   c) storing quantization information of an immediately preceding block;
   d) generating a difference between the quantization information of the immediately preceding block and the first quantization information of the block currently being processed; and
   e) selecting the quantization information of the immediately preceding block as the second quantization information when the difference falls within the set range.

14. The program according to claim 13, further comprising:
   selecting the first quantization information as the second quantization information when the difference falls out of the set range.

15. The program according to claim 13, wherein step b) comprises:
   generating a frequency distribution of values of first quantization information for the blocks of an already encoded image;
   dividing a possible range of values of the first quantization information into a plurality of regions; and
   generating, as the second quantization information, a representative value for a region to which the first quantization information of the block currently being processed belongs, according to the frequency distribution.

* * * * *